(12) United States Patent  (10) Patent No.: US 8,396,519 B2
Christensen et al.  (45) Date of Patent: Mar. 12, 2013

(54) ELECTRONIC DEVICE

(75) Inventors: Claus Allan Christensen, Copenhagen (DK); Niels Ebbe Jacobsen, Dragor (DK)

(73) Assignee: Nokia Corporation, Espoo (FI)

( * ) Notice: Subject to any disclaimer, the term of this patent is extended or adjusted under 35 U.S.C. 154(b) by 627 days.

(21) Appl. No.: 12/518,809

(22) PCT Filed: Dec. 11, 2006

(86) PCT No.: PCT/EP2006/012067

§ 371 (c)(1), (2), (4) Date: Apr. 20, 2010

(87) PCT Pub. No.: WO2008/071217

PCT Pub. Date: Jun. 19, 2008

(65) Prior Publication Data

US 2010/0216527 A1   Aug. 26, 2010

(51) Int. Cl.
*H04M 1/00* (2006.01)
(52) U.S. Cl. .................................. 455/575.3; 455/575.4
(58) Field of Classification Search ............... 455/575.3, 455/575.4; 379/433.12, 433.13
See application file for complete search history.

(56) References Cited

U.S. PATENT DOCUMENTS

| 6,766,181 | B1 * | 7/2004 | Newman et al. | 455/575.3 |
| 6,850,226 | B2 * | 2/2005 | Finke-Anlauff | 345/169 |
| 7,127,277 | B2 * | 10/2006 | Shiue et al. | 455/575.3 |
| 7,158,817 | B2 * | 1/2007 | Kubo | 455/575.3 |
| 7,353,050 | B2 * | 4/2008 | Im et al. | 455/575.3 |
| 7,450,978 | B2 * | 11/2008 | Park | 455/575.3 |
| 7,467,000 | B2 * | 12/2008 | Shiba | 455/575.8 |
| 7,515,707 | B2 * | 4/2009 | Ka et al. | 379/433.12 |
| 2004/0198458 | A1 * | 10/2004 | Kawamura | 455/566 |
| 2005/0236869 | A1 | 10/2005 | Ka et al. | |
| 2006/0135227 | A1 * | 6/2006 | Chang et al. | 455/575.3 |
| 2006/0229115 | A1 * | 10/2006 | Puranen | 455/575.1 |

FOREIGN PATENT DOCUMENTS

| CN | 1681380 A | 10/2005 |
| EP | 1653713 A | 5/2006 |
| EP | 1667410 A | 6/2006 |
| EP | 1691532 A | 8/2006 |

OTHER PUBLICATIONS

International Search Report and Written Opinion of the International Searching Authority for PCT Application No. PCT/EP2006/012067, dated Apr. 10, 2007, 11 pages.

(Continued)

*Primary Examiner* — Duc M Nguyen
(74) *Attorney, Agent, or Firm* — Harrington & Smith (57) ABSTRACT

An electronic device comprising a first housing (110) and a second housing (112), the first and second housings arranged to provide a device open configuration (FIG. 1), a first device closed configuration (FIG. 5) and a second device closed configuration (FIG. 6), wherein in the device closed configurations a first face of the first housing and a first face of the second housing are arranged to overlie one another (112, 110), and in the open configuration the first face of the first and second housings are arranged to be spaced apart compared to the closed configurations to reveal the respective first faces (118)/and wherein a first portion of the first face of the second housing is covered by the first face of the first housing in the first device closed configuration (FIG. 5), and the first portion of the first face of the second housing is revealed in the second device closed configuration (FIG. 6).

16 Claims, 7 Drawing Sheets

OTHER PUBLICATIONS

Office Action received from European Patent Application No. 06829618.5, dated Feb. 17, 2011, 5 pages.

Office Action received from Chinese Patent Application No. 200680056589.0, dated Jan. 13, 2011, 15 pages.

* cited by examiner

ELECTRONIC DEVICE

RELATED APPLICATION

This application was originally filed as and claims priority to PCT Application No. PCT/EP2006/012067 filed on Dec. 11, 2006.

The invention relates to an electronic device.

BACKGROUND

A known fold phone includes upper and lower parts which are foldable relative to one another between open and closed configurations. Inner faces of the upper and lower parts include a display and a keypad respectively, which are accessible in the open configuration but not in the closed configuration. An outer face of the upper part includes keys for controlling certain functions of the phone.

The listing or discussion of a prior-published document in this specification should not necessarily be taken as an acknowledgement that the document is part of the state of the art or is common general knowledge.

SUMMARY

According to a first aspect of the invention, there is provided an electronic device comprising a first housing and a second housing, the first and second housings arranged to provide a device open configuration, a first device closed configuration and a second device closed configuration, wherein in the device closed configurations a first face of the first housing and a first face of the second housing are arranged to overlie one another, and in the open configuration the first face of the first and second housings are arranged to be spaced apart compared to the closed configurations to reveal the respective first faces, and wherein a first portion of the first face of the second housing is covered by the first face of the first housing in the first device closed configuration, and the first portion of the first face of the second housing is revealed in the second device closed configuration.

The first and second housings may be arranged to be slid with respect to one another in the device closed configurations to reveal and cover the first portion of the first face of the second housing.

The first and second housings may be connected by a dual hinge arranged to allow the first and second housing to be slid with respect to one another in the device closed configurations to reveal and cover the first portion of the first face of the second housing.

The first and second housings may be arranged to rotate about one or more axes of rotation to provide the open and closed configurations.

The first housing may comprise a slidable portion arranged to be slid over the first portion of the second housing in the device closed configurations to reveal and cover the first portion of the first face of the second housing.

The first portion may be comprised on a slidable portion of the second housing to allow the first portion of the second housing to be slid with respect to the first face of the first housing to reveal and cover the first portion of the first face of the second housing in the device closed configurations.

The first portion of the second housing may comprise a user interface.

The first portion of the second housing may comprise a user interface arranged to be used to operate one or more functional modes of the device.

The first portion of the second housing may comprise a user input interface arranged to be used to operate one or more functional modes of the device.

The first portion of the second housing may comprise a user output interface arranged to be used to operate one or more functional modes of the device.

The first portion of the second housing may comprise a user interface arranged to be used to operate one or more functional modes of the device, and wherein the first face of the second housing comprises a second portion comprising a second user interface arranged to be used to operate the device in the open configuration.

The first faces of the devices may completely overlie one another in the first device closed configuration.

The first face of the first housing may overlie a user interface located on the first portion of the second housing in the first device closed configuration.

The first face of the first housing may comprise a user interface, and the first portion comprises a user interface.

The first portion may comprise one or more user input elements arranged to provide control of one particular function of the device.

The first portion may comprise one or more user input elements arranged to provide control of a particular function of the device according to the functional mode of the device. For example, in TV mode, the user input elements may provide TV control; in music mode, the user input elements may provide music control; in phone mode, the user input elements may provide phone control.

The first portion may comprise one or more user input elements, the function performable by one or more of the user input elements being changeable according to a position in the menu used to operate the functional mode of the device.

The first portion may comprise one or more user input elements, the function performable by one or more of the user input elements not being changeable.

The first portion may comprise one or more user input elements, the function performable by one or more of the user input elements not being changeable in a particular functional mode of the device.

The first portion may comprise one or more user input elements, the function provided by one or more of the user input elements changing according to the particular position in the menu.

The first portion may comprise one or more user input elements arranged to provide soft key user input control.

The first portion may comprise one or more user input elements arranged to provide soft key user input control, the function performable by the one or more user input element being provided on a display located on a second face of first housing.

The first portion may comprise one or more user input elements arranged to provide soft key user input control, the function performable by the one or more user input element being provided on a display located on a second face of first housing, the second face of the first housing opposing the first of the first housing.

The device may be arranged such that the user interface is powered up when the device is in the second closed configuration and in the open configuration, and powered down when the device is in the first closed configuration.

According to a second aspect of the invention, there is provided an electronic apparatus comprising a first means for housing and a second means for housing, the first and second means for housing arranged to provide a device open configuration, a first device closed configuration and a second device closed configuration, wherein in the device closed configurations a first face of the first means for housing and a first face of the second means for housing are arranged to overlie one another, and in the open configuration the first face of the first and second means for housings are arranged to be spaced apart compared to the closed configurations to reveal the respective first faces, and wherein a first portion of the first face of the means for second housing is covered by the first face of the first means for housing in the first device closed configuration, and the first portion of the first face of the second means for housing is revealed in the second device closed configuration.

According to a third aspect of the invention, there is provided a method of operating an electronic device, the electronic device comprising a first housing and a second housing, the first and second housings arranged to provide a device open configuration, a first device closed configuration and a second device closed configuration, wherein in the device closed configurations a first face of the first housing and a first face of the second housing are arranged to overlie one another, and in the open configuration the first face of the first and second housings are arranged to be spaced apart compared to the closed configurations to reveal the respective first faces, and wherein a first portion of the first face of the second housing is covered by the first face of the first housing in the first device closed configuration, and the first portion of the first face of the second housing is revealed in the second device closed configuration, the method comprising moving the first and second housings between the device closed configurations to reveal/cover access to the first portion of the second housing.

Any circuitry may include one or more processors, memories and bus lines. One or more of the circuitries described may share circuitry elements.

The present invention includes one or more aspects, embodiments or features in isolation or in various combinations whether or not specifically stated (including claimed) in that combination or in isolation.

BRIEF DESCRIPTION OF THE DRAWINGS

A description is now given, by way of example only, with reference to the accompanying drawings, in which:—

DETAILED DESCRIPTION

Figure 1:
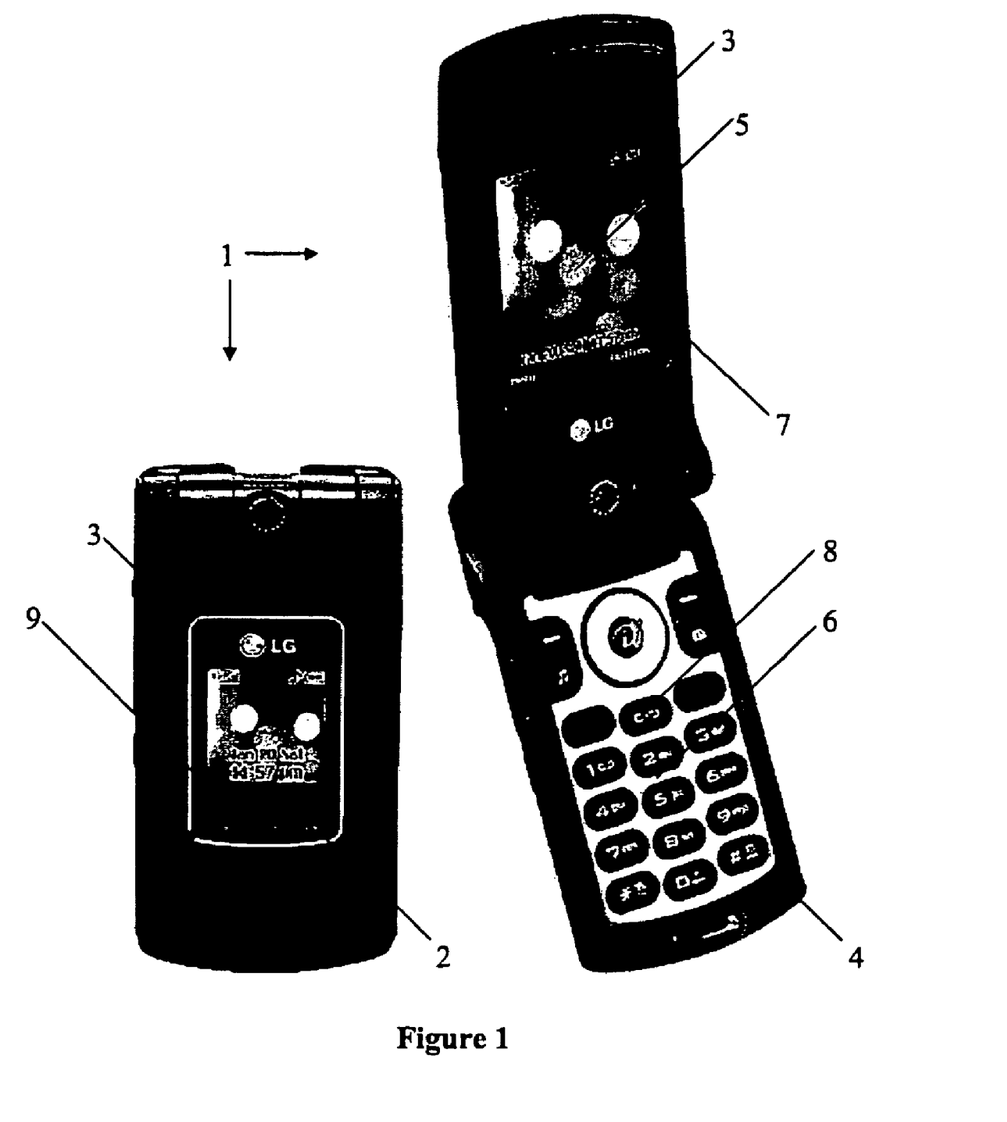
FIG. 1 shows a known fold phone in open and closed configurations.

FIG. 1 shows a known fold phone 1 in an open configuration (right-hand image) and in a closed configuration (left-hand image). The fold phone 1 includes upper and lower parts 3, 4 which are foldable relative to one another between the open and closed configurations. Inner faces 5, 6 of the upper and lower parts include a display 7 and a keypad 8 respectively, which are accessible in the open configuration but not in the closed configuration. An outer face 9 of the upper part 3 includes keys 2 for controlling certain functions of the phone 1.

Figure 2:
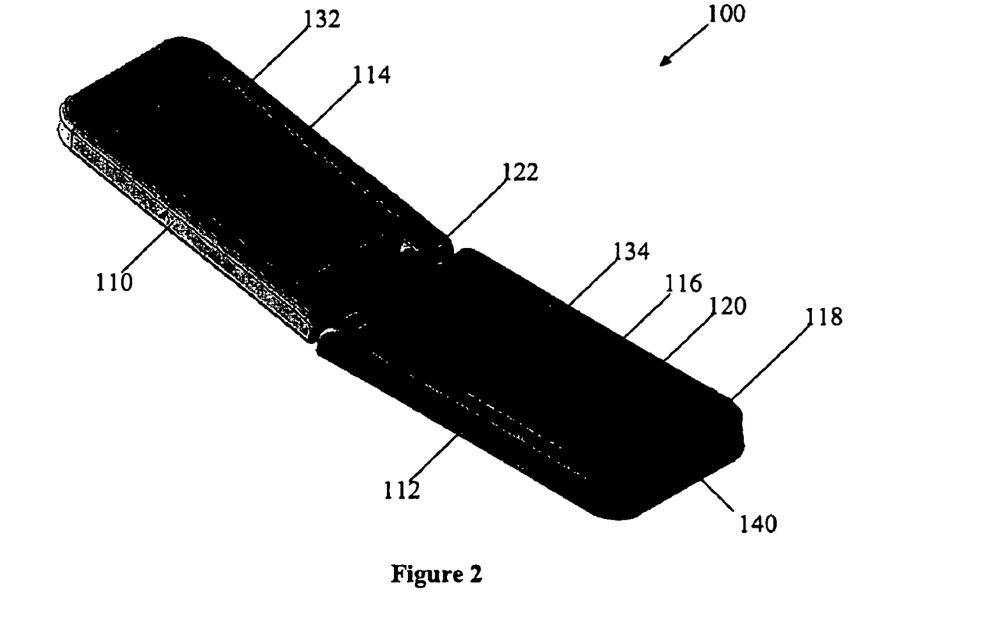
FIG. 2 shows a first electronic device in an open configuration.
Figure 3:
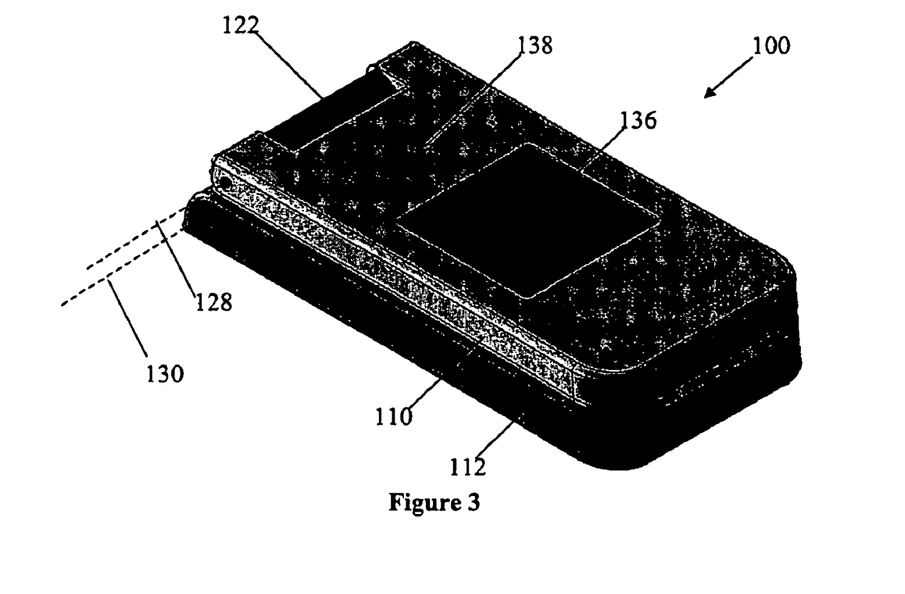
FIG. 3 shows the electronic device of FIG. 2 in a first closed configuration.
Figure 4:
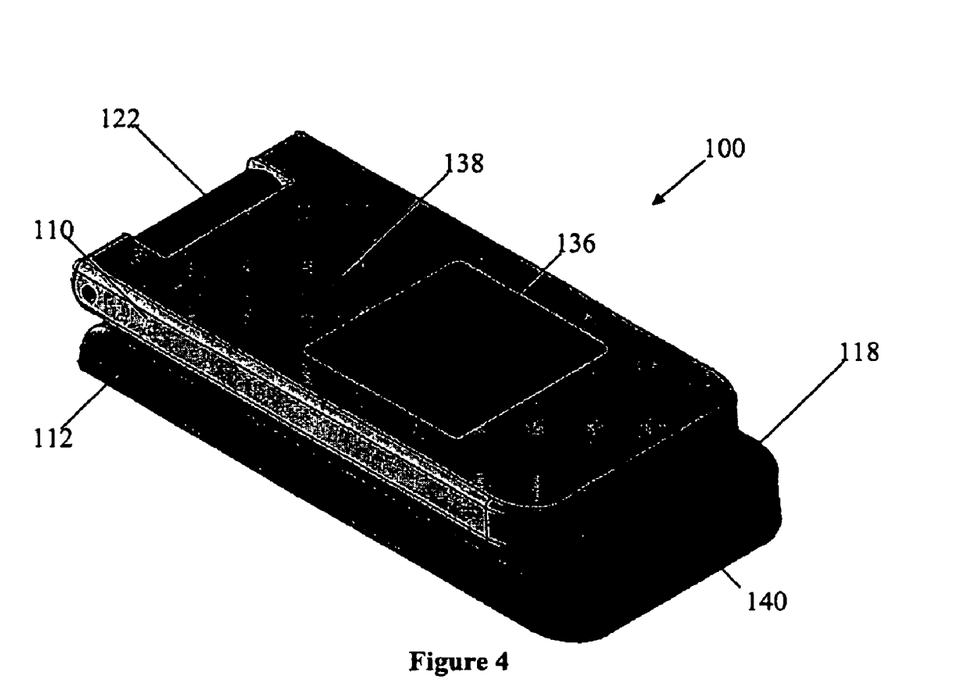
FIG. 4 shows the electronic device of FIG. 2 in a second closed configuration.
Figure 5:
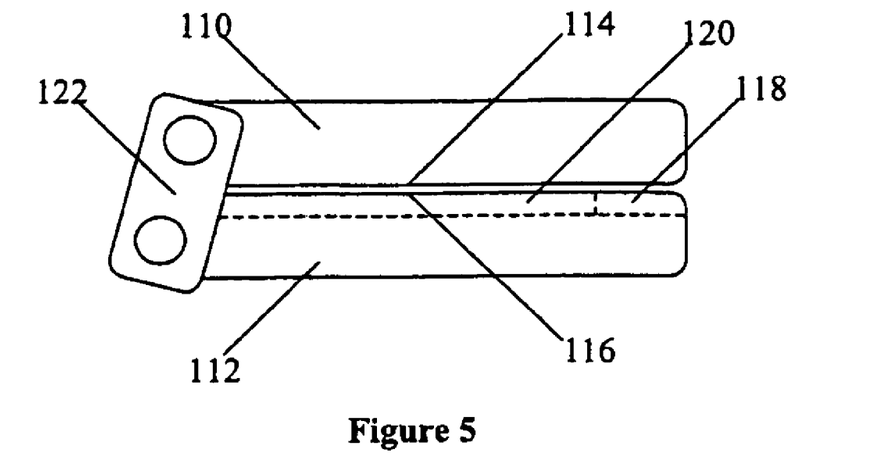
FIG. 5 is a schematic diagram of the electronic device of FIG. 2 in a first closed configuration.
Figure 6:
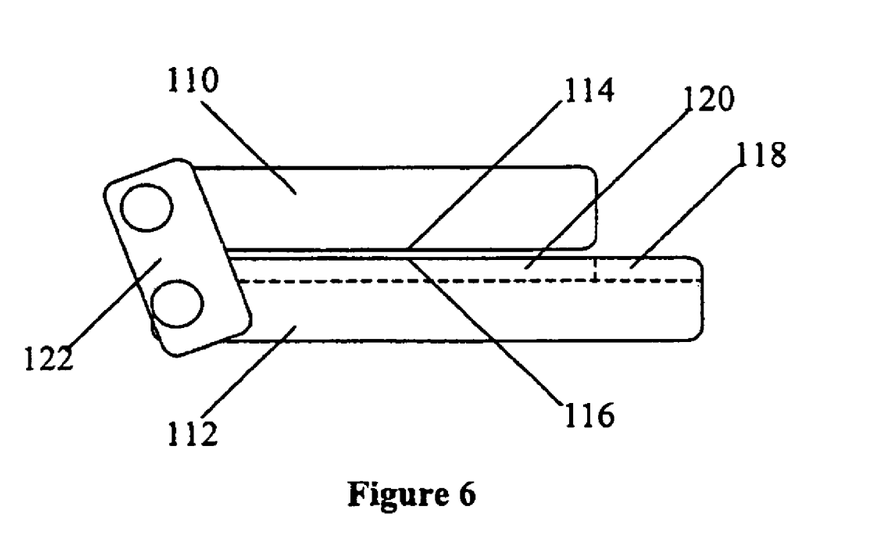
FIG. 6 is a schematic diagram of the electronic device of FIG. 2 in a second closed configuration.

FIGS. 2 to 6 show a first electronic device 100 including a first housing 110 and a second housing 112. The first and second housings 110, 112 are arranged to provide an open configuration (FIG. 2), a first closed configuration (FIG. 3) and a second closed configuration (FIG. 4).

In the closed configurations, a first face 114 of the first housing 110 and a first face 116 of the second housing 112 overlie one another. In the open configuration, the first faces 114, 116 of the first and second housings 110, 112 are spaced apart compared to their relative positions in the closed configurations to reveal the respective first faces 114, 116.

FIG. 3 shows a first closed configuration, in which the first faces 114, 116 of the devices (completely) overlie one another, and in which a first portion 118 of the first face 116 of the second housing 112 is covered by the first face 114 of the first housing 110. The first portion 118 cannot be seen in FIG. 3. When the device 100 is moved to the second closed configuration, as shown in FIG. 4, the first portion 118 of the first face 116 of the second housing 112 is revealed.

The first and second housings 110, 112 are connected by a dual hinge 122 arranged to allow the first and second housings 110, 112 to be slid with respect to one another in the closed configurations to reveal and cover the first portion 118 of the first face 116 of the second housing 112. The first and second housings 110, 112 are arranged to rotate about respective axes of rotation 128, 130 (shown in FIG. 3) provided by the dual hinge 122, in order to provide the open and closed configurations. When the first and second housings 110, 112 are slid with respect to one another, the axes of rotation 128, 130 move in parallel planes.

The device 100 includes various user interfaces, as shown in FIGS. 2 and 3. The first face 114 of the first housing 110 includes a first display 132. The second portion 120 of the first face 116 of the second housing 112 includes a first keypad 134. The first keypad 134 and the first display 132 can be used to operate the device 100 only in the open configuration. A second face 138 (opposite the first face 114) of the first housing 110 includes a second display 136, shown in FIG. 3. The second display 136 is most easily used to operate the device 100 in a closed configuration.

It should be understood that any user interface described so far may be replaced with a different user interface, for example a keypad, a display or a touchscreen, or omitted entirely.

In addition, the first portion 118 of the second housing 112 includes a user interface, which in this embodiment is a second keypad 140, shown in FIGS. 2 and 4. The second keypad 140 is arranged to be used to operate one or more functions of the device 100, for example music player functions. As is apparent from FIGS. 2 to 4, the second keypad 140 is accessible when the device 100 is in the open configuration and in the second closed configuration, and is inaccessible when the device 100 is in the first closed configuration.

In other embodiments, the user interface of the first portion 118 may provide input and/or output functions and may take the form of a keypad, one or more user input elements, a display, a touchscreen, any other user interface, or any combination of two or more of those user interfaces. The function performed by the user interface may vary according to the functional mode of the device 100, and/or according to a position in a menu used to operate the functional mode(s) of the device 100. Alternatively, the function performed by the user interface may not be changeable, and/or may not be changeable in a particular functional mode of the device 100. The first portion 118 may provide soft key user input control. The function performable by the user interface may be displayed on one or more of the displays located on the device 100. The device 100 may be arranged such that the user interface is powered up when the device is in the second closed configuration and in the open configuration, and powered down when the device is in the first closed configuration.

Figure 7:
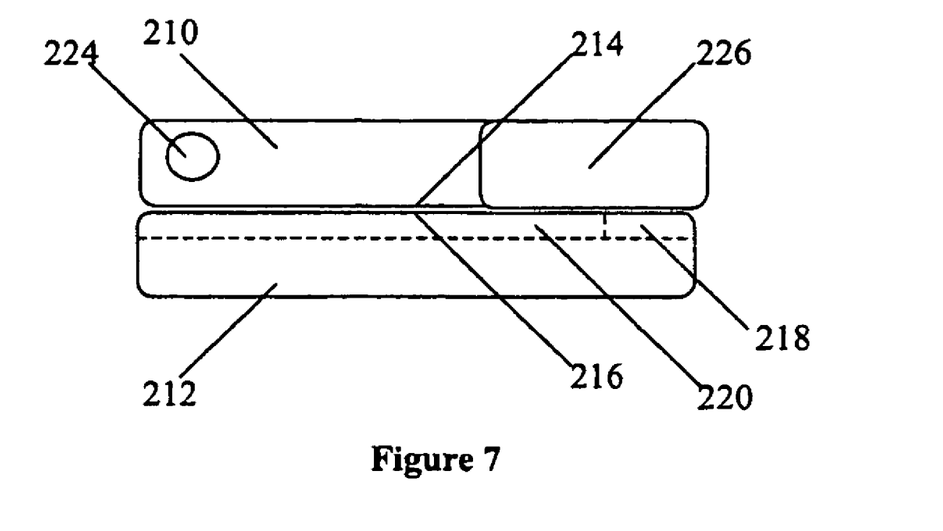
FIG. 7 is a schematic diagram of a second electronic device in a first closed configuration.
Figure 8:
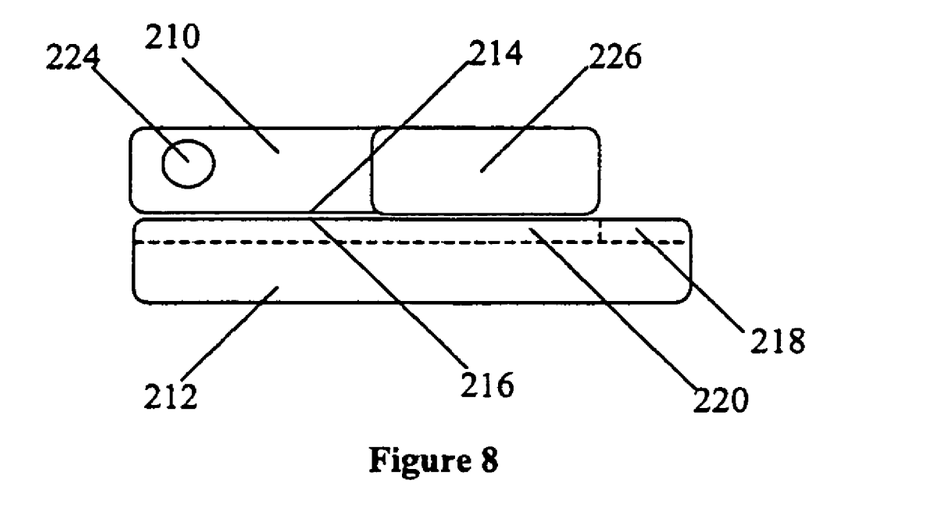
FIG. 8 is a schematic diagram of the electronic device of FIG. 7 in a second closed configuration.

FIGS. 7 and 8 show a second electronic device 200 in a first closed configuration and in a second closed configuration respectively.

The first housing 210 of the device 200 includes a slidable portion 226 arranged to be slid over the first portion 218 of the second housing 212 in the closed configurations to reveal and cover the first portion 218 of the first face 216 of the second housing 212.

Figure 9:
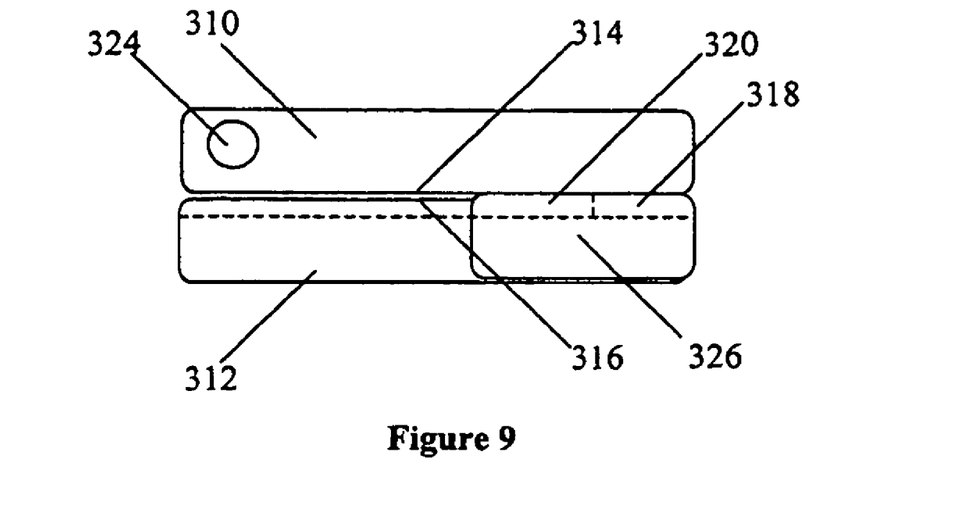
FIG. 9 is a schematic diagram of a third electronic device in a first closed configuration.
Figure 10:
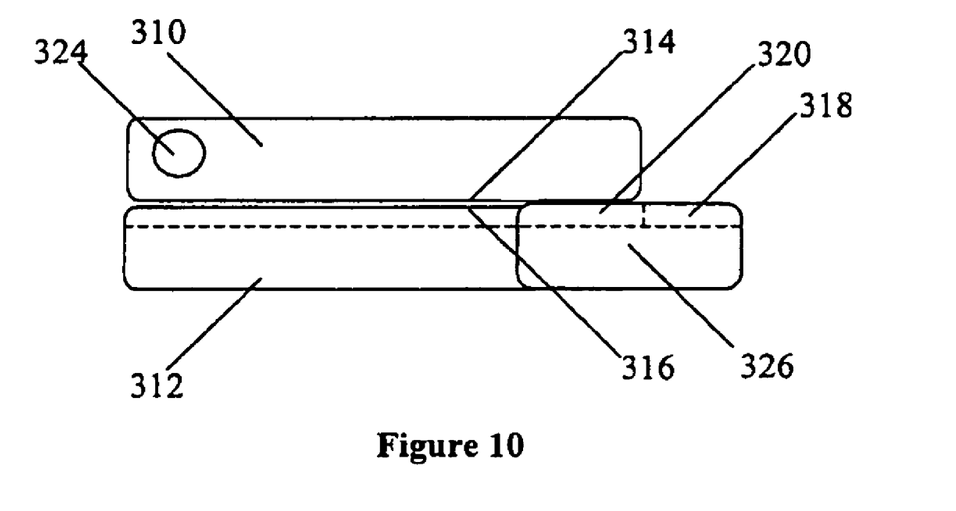
FIG. 10 is a schematic diagram of the electronic device of FIG. 9 in a second closed configuration.

FIGS. 9 and 10 show a third electronic device 300 in a first closed configuration and in a second closed configuration respectively.

The first portion 318 is comprised on a slidable portion 326 of the second housing 312 to allow the first portion 318 of the second housing 312 to be slid with respect to the first face 314 of the first housing 310 to reveal and cover the first portion 318 of the first face 316 of the second housing 312 in the closed configurations.

Figure 11:
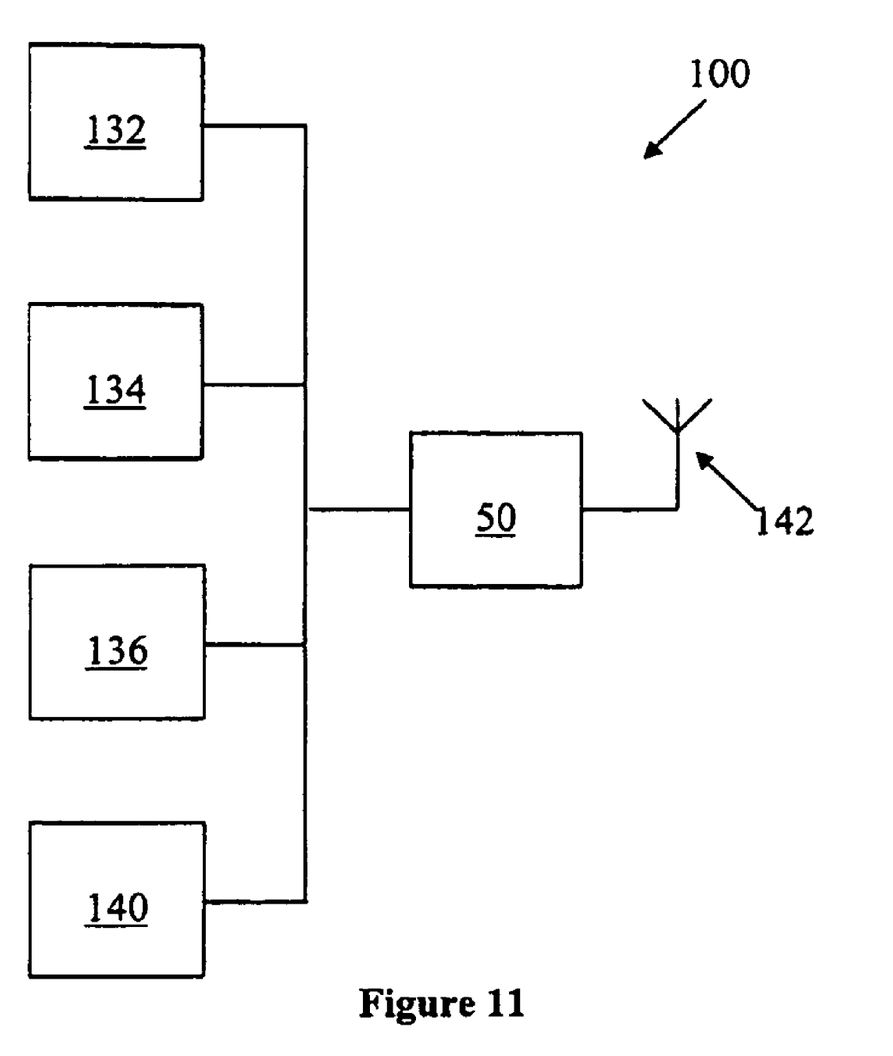
FIG. 11 is a schematic diagram of circuitry of the device of FIG. 2.

FIG. 11 is a schematic diagram of circuitry of the device 100. The first display 132, first keypad 134, second display 136 and second keypad 140 are connected to main circuitry 50, which includes all processing circuitry, memory and transceiver circuitry of the device 100. The device 100 includes an antenna 142 connected to main circuitry 50. In a variant, the antenna 142 and/or transceiver circuitry are omitted.

It will be appreciated that the aforementioned circuitry may have other functions in addition to the mentioned functions, and that these functions may be performed by the same circuit.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An electronic device comprising a first housing and a second housing, the first and second housings configured to provide a device open configuration, a first device closed configuration and a second device closed configuration, wherein, in the device closed configurations, a first face of the first housing and a first face of the second housing are configured to overlie one another and, in the open configuration, the first face of the first and second housings are configured to be spaced apart compared to the closed configurations to reveal the respective first faces, wherein, in a first device closed configuration, a first portion of the first face of the second housing is covered by the first face of the first housing and, in a second device closed configuration, the first portion of the first face of the second housing is revealed so as to provide a user operable interface, wherein an outer face of the first housing comprises at least one of a menu and a key to select a functional mode of one or more functional modes of the device, and wherein the provided user operable interface of the first portion of the first face of the second housing is configured in response to the selecting to be used to operate the selected functional mode of the device.

2. The device according to claim 1, wherein the first and second housings are configured to be slid with respect to one another in the device closed configurations to reveal and cover the first portion of the first face of the second housing.

3. The device according to claim 1, wherein the first and second housings are connected by a dual hinge configured to allow the first and second housing to be slid with respect to one another in the device closed configurations to reveal and cover the first portion of the first face of the second housing.

4. The device according to claim 1, wherein the first and second housings are configured to rotate about at least two parallel axes of rotation to provide the open and closed configurations.

5. The device according to claim 1, wherein the first housing comprises a slidable portion configured to be slid over the first portion of the first face of the second housing in the device closed configurations to reveal and cover the first portion of the first face of the second housing.

6. The device according to claim 1, wherein the first portion of the first face of the second housing is comprised on a slidable portion of the second housing to allow the first portion of the first face of the second housing to be slid with respect to the first face of the first housing to reveal and cover the first portion of the first face of the second housing in the device closed configurations.

7. The device according to claim 1, wherein the first face of the second housing comprises a second portion comprising a second user interface configured to be used to operate the device in the open configuration.

8. The device according to claim 1, wherein the first faces of the devices completely overlie one another in the first device closed configuration.

9. The device according to claim 1, wherein the first portion comprises one or more user input elements configured to provide control of one particular function of the device.

10. The device according to claim 1, wherein the first portion comprises one or more user input elements configured to provide soft key user input control.

11. The device according to claim 1, wherein the first portion comprises one or more user input elements configured to provide soft key user input control, the function performable by the one or more user input element being provided on a display located on a second face of the first housing.

12. The device of claim 1 configured such that the user operable interface is powered up when the device is in the second closed configuration and in the open configuration, and powered down when the device is in the first closed configuration.

13. The device according to claim 1, wherein the functional mode comprises a music player mode, and wherein the user operable interface of the first portion of the first face of the second housing is configured in response to the selection to control music player functions of the music player mode.

14. An electronic apparatus comprising a first means for housing and a second means for housing, the first and second means for housing configured to provide an apparatus open configuration, a first apparatus closed configuration and a second apparatus closed configuration,
    wherein, in the apparatus closed configurations, a first face of the first means for housing and a first face of the second means for housing are configured to overlie one another and, in the open configuration, the first face of the first and second means for housings are configured to be spaced apart compared to the closed configurations to reveal the respective first faces,
    wherein, in a first apparatus closed configuration, a first portion of the first face of the means for second housing is covered by the first face of the first means for housing and, in a second apparatus closed configuration, the first portion of the first face of the second means for housing is revealed so as to provide a user operable interface,
    wherein an outer face of the first means for housing comprises at least one of a menu and a key to select a functional mode of one or more functional modes of the apparatus, and
    wherein the user operable interface of the first portion of the first face of the second means for housing is configured in response to the selecting to be used to operate the selected functional mode of the apparatus.

15. A method comprising:
    operating an electronic device, the electronic device comprising a first housing and a second housing, the first and second housings configured to provide a device open configuration, a first device closed configuration and a second device closed configuration,
        wherein, in the device closed configurations, a first face of the first housing and a first face of the second housing are configured to overlie one another and, in the open configuration, the first face of the first and second housings are configured to be spaced apart compared to the closed configurations to reveal the respective first faces, and
        wherein, in a first device closed configuration, a first portion of the first face of the second housing is covered by the first face of the first housing and, in a second device closed configuration, the first portion of the first face of the second housing is revealed so as to provide a user operable interface;
    moving the first and second housings between the device closed configurations to reveal/cover access to the first portion of the second housing;
    selecting, using one of a menu and a key on an outer face of the first housing, a functional mode of one or more functional modes of the device, and
    in response to the selecting, configuring the user operable interface of the first portion of the first face of the second housing to be used to operate the selected functional mode of the device.

16. The method according to claim 15, wherein the first and second housings are configured to rotate about at least two parallel axes of rotation to provide the open and closed configurations.

* * * * *